Aug. 11, 1970  D. G. MacBEAN  3,523,867

FOURDRINIER WIRE BELT

Filed Jan. 26, 1967  2 Sheets-Sheet 1

INVENTOR
Donald G. MacBEAN

ATTORNEY

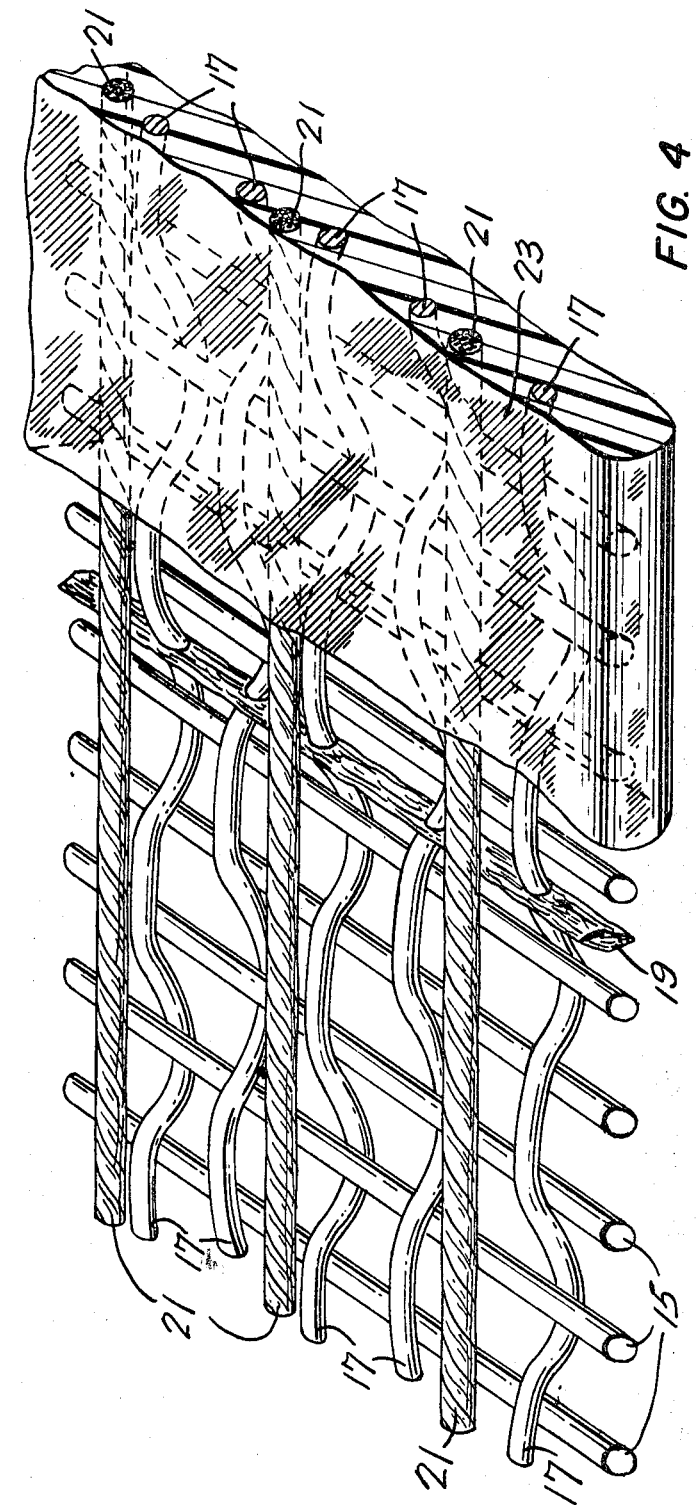

United States Patent Office 3,523,867
Patented Aug. 11, 1970

3,523,867
FOURDRINIER WIRE BELT
Donald G. MacBean, Pierrefonds, Quebec, Canada, assignor to The Johnson Wire Works Limited, Montreal, Quebec, Canada
Filed Jan. 26, 1967, Ser. No. 612,027
Claims priority, application Great Britain, Jan. 28, 1966, 3,947/66
Int. Cl. D21f *1/10;* B21f *27/00*
U.S. Cl. 162—348         10 Claims

ABSTRACT OF THE DISCLOSURE

A Fourdrinier wire belt having its marginal edges reinforced by a high tensile strength material strand juxtaposed to the wire and held in place by plastic material adhering to the strand and wire.

---

This invention relates to Fourdrinier wire belts used for paper-making.

The invention aims to improve the resistance of the edges of such belts to damage and cracking without materially stiffening the belt or increasing its thickness. This is done, according to the invention, by providing the belt with an edging which is applied after the wire has been seamed and preferably after it has been trimmed to its finished width. This edging is constructed by placing continuous reinforcing strands of high tensile strength material warpwise of the mesh, and applying to hold them in place, a flexible embedding material, preferably a thermoplastic material, which surrounds and adheres both to the strands and to the woven wire structure.

To illustrate the invention more fully, a specific preferred embodiment is shown in the accompanying drawings, in which:

FIG. 4 is a greatly enlarged somewhat schematic fragmentary perspective view of the belt of FIGS. 1 to 3.

Figure 1:
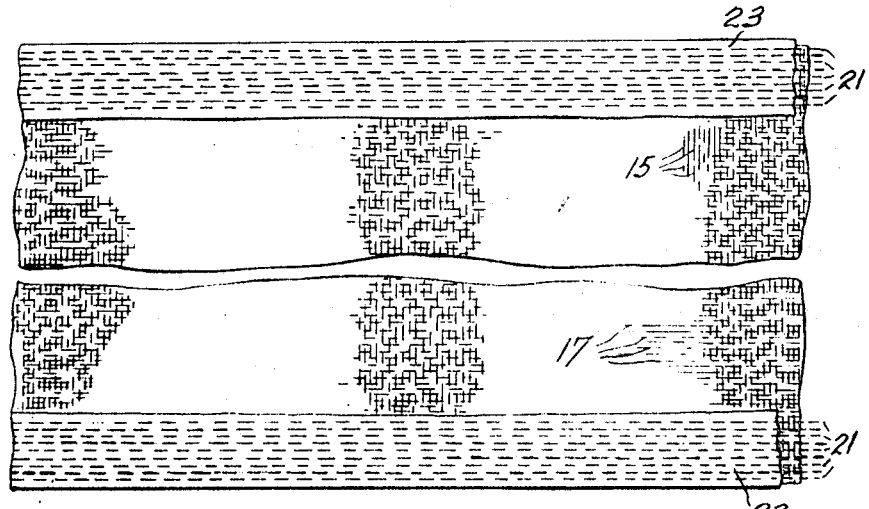
FIG. 1 is a plan view of a portion of the length of a Fourdrinier wire belt having its edges reinforced in accordance with the invention.
Figure 2:
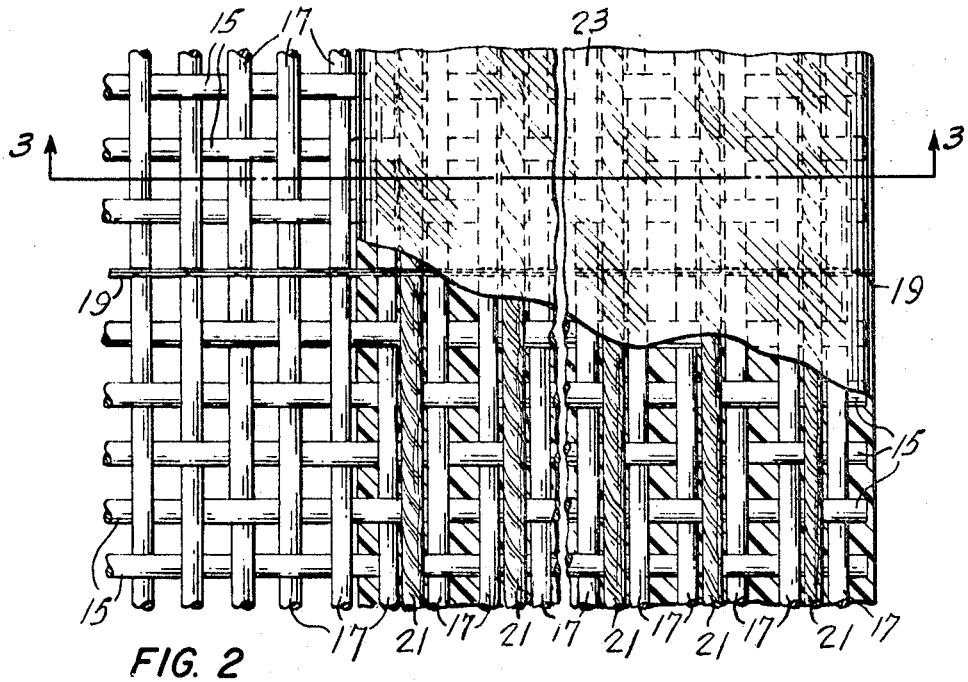
FIG. 2 is a greatly enlarged fragmentary bottom plan view of the belt of FIG. 1.
Figure 3:
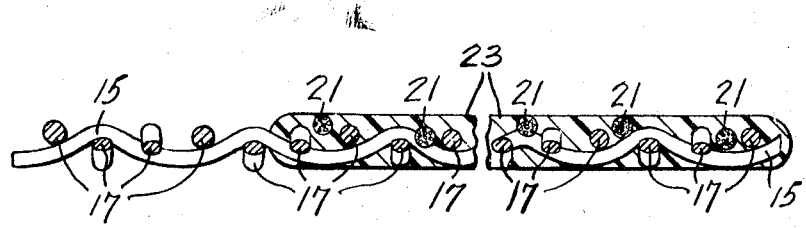
FIG. 3 is a vertical cross-section along the line 3—3 of FIG. 2.

Referring to the drawings, the Fourdrinier wire belt is made up of weft (shute) wires 15 and warp wires 17; 19 is a precision welded seam of conventional nature joining the free ends of the as-woven belt. Belts of this nature run from six feet to thirty feet in width and the wires 15 to 17 generally have diameters of from 0.004″ to 0.020″. In accordance with the invention, reinforcing strands 21 are placed against and into the mesh on the underside or wear face of a marginal strip at each side of the belt so that they lie in essentially straight paths warpwise and so that they are not subjected to the wear which would occur if they protruded from below the surface of the wire. The reinforcing yarns are held in place by a mass of an embedding material 23, preferably thermoplastic material, which surrounds both the reinforcing yarns and the woven wire structure and flexes with this structure as an integral part of it.

In the manufacture of the belt, the fabric is woven in a conventional manner and the free ends of the warp wires 17 joined in a precision manner by the seam 19 either by soldering or welding as is well known. The edges of the belt are then trimmed and reinforcing strands 21 fed into contact with the marginal strip of the belt from bobbins mounted on a rack. A marshall is used to position the strands 21 in their desired positions so that they lie in essentially straight paths warpwise of the belt. As shown, the strands 21 tend to lie below the surface of the warp wires 17. The belt is then passed through the nip between two pressure rollers to urge the strands into the wire fabric.

The thermoplastic embedding material is then applied to surround both the reinforcing yarns 21 and the woven wire structure. This may be accomplished by use of a thermoplastic covering strip or tape which is flattened as applied or by spraying the thermoplastic material in liquid form or otherwise. If a tape or covering strip of thermoplastic material is used, a further pair of rollers are employed to heat (and hence soften) the strip or tape and cause the material to flow around the wires and strands. It is possible, according to a further method, to apply a thermoplastic tape with the strands pre-embedded therein. In any event, the thermoplastic material adheres both to the reinforcing strands and to the wire of the belt so that the reinforcing structure effectively becomes an integral part of the belt.

The reinforcing strands can be monofilament or multifilament yarns, cords, wires or cables of flexible high tensile strength material, preferably plastic or metal and most preferably highly oriented linear synthetic resins, examples of which are nylon or polyester resins. The thermoplastic embedding material may preferably be nylon, polyethylene, or polyvinyl-chloride.

Generally, Fourdrinier wire belts range from 6 feet to 30 feet in width. Preferably the strands will appear in two out of every three gaps between the warp wires. Preferably, the reinforced edge is about ½ inch wide but may be wider, for example extending up to 1 inch. The number of reinforcing strands may vary according to requirements, for example, ten, but there may be more, say up to 17. One blank warp space is desirable between each reinforcing strand to allow easy flow of the embedding plastic material. The strands preferably have a diameter in the range 0.001″ to 0.020″.

The present invention overcomes the disadvantages of prior attempts to reinforce the edges of woven Fourdrinier belts. For example it has the advantage over one of the better prior methods of reinforcement, where plastic yarns are woven into the edge, in that the loom does not have to be set up in advance to suit a certain width of cloth, and this does not result in a severe curtailment of production flexibility where often a wire of a narrow width must be cut from a wider piece of cloth. Each reinforcing strand 21 is joined to form an endless loop at a location remote from the seam 19 of the belt, and the joints of adjacent strands are also preferably staggered with respect to one another. So special reinforcement does not have to be provided in this area, as in the case of the prior art process.

By way of example, the warp wires 17 can be of the type known as 8% Phosphor bronze, and the weft wires 15 of 80/20 brass. Alternatively, both the warp and weft wires can be of stainless steel, preferably, Type 316 stainless steel.

A preferred composition of such wires is as follows:

8% bronze: | Percent
--- | ---
Tin | 8
Phosphorous | .4
Remainder copper. |

80/20 brass:
Zinc | 20
Copper | 80

316 stainless steel:
Chromium | 17
Nickel | 12
Molybdenum | 2.5

I claim:
1. In a Fourdrinier wire belt having interwoven, flexible warp and weft threads,
said warp and weft threads having an outer forming surface and an inner wear surface,
the improvement comprising:
at least one reinforcing strand extending warpwise in non-woven juxtaposed relation between two adjacent warp threads of the wire and adjacent the wire edges; and
a layer of flexible plastic material overlying and embedding the strands along each edge of the wires and intermingled among the woven warp and weft threads thereat and interconnecting the non-woven reinforcing strand with said wire at the inner surface thereat.

2. The Fourdrinier wire as claimed in claim 1 in which said reinforcing strand is of such a diameter to be disposed approximately within the plane of the adjacent warp threads.

3. The Fourdrinier wire as claimed in claim 1 in which said reinforcing strand is a synthetic plastic.

4. The Fourdrinier wire as claimed in claim 3 in which said synthetic plastic is a highly oriented linear synthetic resin selected from the class consisting of nylon, polyethylene, and polyvinyl chloride.

5. The Fourdrinier wire as claimed in claim 1 in which said layer of plastic material is of the class of nylon, polyethylene, and polyvinyl chloride.

6. The method of producing a reinforced Fourdrinier wire including the steps of:
(a) weaving a wire belt having warp and weft threads forming an outer surface and inner wear surface;
(b) laying along the wear surface adjacent the edges of the woven wire and on the wear surface at least one continuous reinforcing strand disposed between two adjacent warp threads;
(c) applying a layer of plastic reinforcing material on the reinforcing strand and embedding the strand in the reinforcing plastic and engaging the plastic material into the woven warp and weft threads at the wear surface whereby the wear surface is a multiple lamination comprising the woven wire, the reinforcing strand and the plastic layer.

7. The method as claimed in claim 6 including the step of applying pressure to the strands to dispose the strands approximately in the plane of the adjacent warp threads.

8. The method as claimed in claim 6 in which said layer of plastic is applied as a continuous thermoplastic tape, applying heat to said tape and causing the strands to be embedded in the heated tape and the tape to enter between the woven warp and weft threads, cooling the layer of woven wire, strand and tape.

9. The method as claimed in claim 6 including the step of applying said layer of plastic onto said strands as a liquid and permitting it to dry.

10. The method as claimed in claim 6 including the steps of pre-embedding the strands in a thermoplastic tape, applying the tape at the edges of the woven wire and on the wear surface, heating the tape and causing the heated tape and embedded wire to adhere to the inner wear surface of the woven wire.

References Cited
UNITED STATES PATENTS

| | | | |
|---|---|---|---|
| 211,444 | 1/1879 | Van Houten | 139—425.5 |
| 1,800,872 | 4/1931 | Peterson | 139—425.5 |
| 2,207,609 | 7/1940 | Buchanan | 139—425.5 |
| 2,659,958 | 11/1953 | Johnson | 162—348 X |
| 3,076,252 | 2/1963 | Hoffman | 139—425 X |

S. LEON BASHORE, Primary Examiner

F. FREI, Assistant Examiner

U.S. Cl. X.R.

117—43; 139—425; 140—24; 161—95; 245—8, 10